United States Patent
Chien

(10) Patent No.: US 11,477,564 B1
(45) Date of Patent: Oct. 18, 2022

(54) EARPHONE MODULE

(71) Applicant: Merry Electronics Co., Ltd., Taichung (TW)

(72) Inventor: Jui-Hsien Chien, Taichung (TW)

(73) Assignee: Merry Electronics Co., Ltd., Taichung (TW)

( * ) Notice: Subject to any disclaimer, the term of this patent is extended or adjusted under 35 U.S.C. 154(b) by 1 day.

(21) Appl. No.: 17/349,874

(22) Filed: Jun. 16, 2021

(30) Foreign Application Priority Data

Apr. 23, 2021 (TW) .................................. 110114720

(51) Int. Cl.
| H04R 1/10 | (2006.01) |
| G06F 3/041 | (2006.01) |
| H01Q 5/335 | (2015.01) |
| H01Q 1/27 | (2006.01) |
| H01Q 13/10 | (2006.01) |
| H01Q 9/06 | (2006.01) |

(52) U.S. Cl.
CPC ........... *H04R 1/1041* (2013.01); *G06F 3/041* (2013.01); *H01Q 1/273* (2013.01); *H01Q 5/335* (2015.01); *H01Q 9/06* (2013.01); *H01Q 13/10* (2013.01); *H04R 1/1016* (2013.01); *H04R 2420/07* (2013.01)

(58) Field of Classification Search
CPC ...... H04R 1/1041; H01Q 5/335; H01Q 1/273; H01Q 9/06; G06F 3/041
See application file for complete search history.

(56) References Cited

U.S. PATENT DOCUMENTS

| 2009/0153411 A1* | 6/2009 | Chiang | H01Q 1/243 343/702 |
| 2009/0153413 A1* | 6/2009 | Leisten | H01Q 1/243 343/702 |
| 2012/0064954 A1* | 3/2012 | Kato | H01Q 1/243 343/751 |
| 2013/0214986 A1* | 8/2013 | Zhu | H01Q 1/243 343/866 |
| 2013/0234906 A1* | 9/2013 | Rosener | H01Q 9/16 343/790 |
| 2015/0043763 A1* | 2/2015 | Troelsen | H01Q 1/273 343/718 |
| 2016/0204499 A1* | 7/2016 | Toh | H01Q 1/521 343/702 |
| 2016/0336643 A1* | 11/2016 | Pascolini | H01Q 9/0421 |
| 2017/0264001 A1* | 9/2017 | Azad | H01Q 13/10 |
| 2019/0305430 A1* | 10/2019 | Thai | H01Q 9/0414 |
| 2020/0203812 A1* | 6/2020 | Murray | H01Q 9/285 |
| 2020/0303824 A1* | 9/2020 | Barrera | H01Q 13/18 |
| 2020/0304216 A1* | 9/2020 | Cooper | H01Q 21/062 |
| 2020/0314567 A1* | 10/2020 | Shriner | H04R 25/65 |
| 2021/0185461 A1* | 6/2021 | Grabowski | H04R 25/609 |

* cited by examiner

*Primary Examiner* — Simon King
(74) *Attorney, Agent, or Firm* — JCIPRNET

(57) ABSTRACT

An earphone module includes an antenna structure. The antenna structure includes a first radiator, a second radiator, a conductive member, and a first insulating member. The first radiator includes a feeding end. The second radiator includes a ground end, and a first slot is formed between the first radiator and the second radiator. The conductive member is connected to the first radiator and the second radiator. The first insulating member is disposed in the first slot. The first radiator, the second radiator, the conductive member, and the first insulating member collectively serve as at least a part of a shell of the earphone module.

13 Claims, 5 Drawing Sheets

EARPHONE MODULE

CROSS-REFERENCE TO RELATED APPLICATION

This application claims the priority benefit of Taiwan application serial no. 110114720, filed on Apr. 23, 2021. The entirety of the above-mentioned patent application is hereby incorporated by reference herein and made a part of this specification.

BACKGROUND

Technical Field

The disclosure generally relates to an earphone module, and in particular, to an earphone module with an antenna.

Description of Related Art

The antenna of a Bluetooth earphone generally has an electric antenna framework, and the antenna is disposed in a shell. Since the characteristic of electric antenna is open-circuited at an end at which the electric current is small and the electric field is strong, frequency band deviation is likely to occur due to the human body dielectric, which in turn affects the antenna efficiency.

SUMMARY

The disclosure is directed to an earphone module in which a shell of the earphone module forms a magnetic antenna framework. Since its resonant mode is less likely to be affected by the human body, the antenna efficiency is enhanced.

An earphone module of an embodiment of the disclosure includes an antenna structure. The antenna structure includes a first radiator, a second radiator, a conductive member, and a first insulating member. The first radiator includes a feeding end. The second radiator includes a ground end, and a first slot is formed between the first radiator and the second radiator. The conductive member is connected to the first radiator and the second radiator. The first insulating member is disposed in the first slot. The first radiator, the second radiator, the conductive member, and the first insulating member collectively serve as at least a part of a shell of the earphone module.

In an embodiment of the disclosure, the earphone module further includes a touch panel and a second insulating member. The touch panel is disposed beside the first radiator, and a second slot is formed between the touch panel and the first radiator. The second insulating member is disposed in the second slot. The first radiator, the second radiator, the conductive member, the first insulating member, the touch panel, and the second insulating member collectively serve as the shell of the earphone module.

In an embodiment of the disclosure, the touch panel and the first radiator are located at different planes.

In an embodiment of the disclosure, the earphone module further includes a first circuit board disposed in the shell and including a first antenna spring and a second antenna spring located at two opposite surfaces. The first antenna spring abuts against the feeding end of the first radiator, and the second antenna spring abuts against the ground end of the second radiator.

In an embodiment of the disclosure, the first circuit board includes an edge close to the first antenna spring and the second antenna spring, and a gap is present between the edge and the shell.

In an embodiment of the disclosure, the first circuit board is aligned with the first slot.

In an embodiment of the disclosure, the earphone module further includes a second circuit board and a flexible circuit board. The second circuit board is disposed in the shell and is disposed at one side of the first circuit board. The flexible circuit board is connected to the first circuit board and the second circuit board to electrically connect the first circuit board to the second circuit board, and the conductive member is disposed corresponding to the flexible circuit board.

In an embodiment of the disclosure, a width of the conductive member is larger than or equal to a width of the flexible circuit board.

In an embodiment of the disclosure, the antenna structure couples out a frequency band, and a length of the first slot is two-thirds of a wavelength of the frequency band.

In an embodiment of the disclosure, the first slot includes a first end and a second end, and the conductive member is located between the first end and the second end. A first distance from a position where the first slot is close to the feeding end to the first end is larger than a second distance from the position where the first slot is close to the feeding end to the second end.

In an embodiment of the disclosure, the first distance is used to couple out a frequency band, and the second distance is used to adjust impedance matching of the frequency band.

In an embodiment of the disclosure, the first distance is larger than or equal to three times the second distance.

In an embodiment of the disclosure, when the earphone module is put in a human ear, the feeding end is close to an antihelix of the human ear and away from an earlobe.

Accordingly, the first radiator, the second radiator, the conductive member, and the first insulating member of the earphone module of the disclosure collectively serve as at least a part of the shell of the earphone module. The first radiator includes a feeding end, and the second radiator includes a ground end. The conductive member is connected to the first radiator and the second radiator. A first slot is formed between the first radiator and the second radiator to separate the first radiator and the second radiator from each other. The first insulating member is disposed in the first slot to keep the appearance complete. Through the design above, the earphone module of the disclosure has an antenna structure in the form of a magnetic antenna, so its resonant mode is less likely to be affected by the human body and the antenna efficiency is enhanced.

DESCRIPTION OF THE EMBODIMENTS

Figure 1:
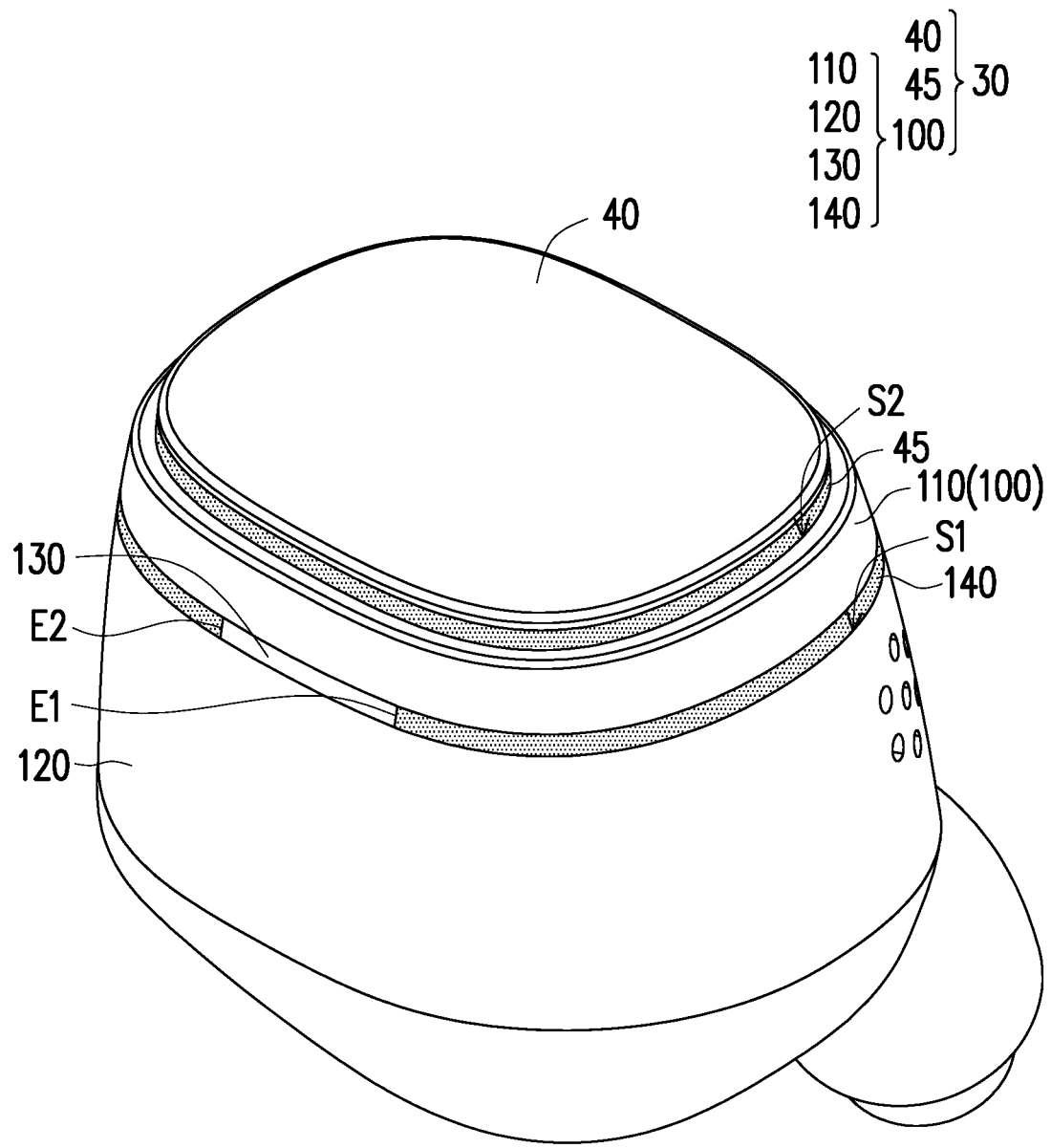
FIG. 1 is a schematic view illustrating the appearance of an earphone module according to an embodiment of the disclosure.

FIG. 1 is a schematic view illustrating the appearance of an earphone module according to an embodiment of the disclosure. Referring to FIG. 1, an earphone module 20 of this embodiment includes an antenna structure 100. The antenna structure 100 includes a first radiator 110, a second radiator 120, a conductive member 130, and a first insulating member 140. In the embodiment, the first radiator 110, the second radiator 120, the conductive member 130, and the first insulating member 140 of the antenna structure 100 collectively serve as at least a part of a shell 30 of the earphone module 20.

More specifically, in the embodiment, the second radiator 120 is a ground radiator. As shown in FIG. 1, the second radiator 120 serves as a large part of the shell 30 of the earphone module 20. The first radiator 110 is a main radiator and is located at one side of the second radiator 120 (e.g., the upper side in FIG. 1). A first slot S1 is formed between the first radiator 110 and the second radiator 120 to separate the first radiator 110 and the second radiator 120 from each other. The width of the first slot S1 is approximately between 0.5 mm and 1.2 mm, but is not limited thereto.

The first insulating member 140 is disposed in the first slot S1 to keep the completeness of the appearance and to maintain a distance between the first radiator 110 and the second radiator 120. The first slot S1 includes a first end E1 and a second end E2. The conductive member 130 is located between the first end E1 and the second end E2 and is connected to the first radiator 110 and the second radiator 120.

In the embodiment, the antenna structure 100 is a magnetic antenna framework of which an electric field is coupled in the first slot S1 (i.e., a slot antenna), and the length of the first slot S1 is two-thirds of a wavelength of a frequency band coupled out by the antenna structure 100. The frequency band coupled out by the antenna structure 100 is, for example, a Bluetooth frequency band of 2.4 GHz, but the frequency band is not limited thereto.

In addition, in the embodiment, the first radiator 110, the second radiator 120, and the conductive member 130 are, for example, metal, and the first insulating member 140 is, for example, plastic. The first radiator 110, the second radiator 120, the conductive member 130, and the first insulating member 140 may be manufactured through injection molding to be integrally formed. However, the materials and the manufacturing methods of the first radiator 110, the second radiator 120, the conductive member 130, and the first insulating member 140 are not limited thereto.

In a conventional electric antenna framework disposed in a shell, since the electric antenna is open-circuited at an end at which the electric current is small and the electric field is strong, frequency band deviation is likely to occur due to the human body dielectric. Furthermore, in an earphone module with an electric antenna framework, an antenna clearance area is required to be provided along the antenna path on the mainboard, so the space on the mainboard cannot be fully used for the circuit layout.

Compared with the conventional electric antenna framework, the antenna structure 100 in the embodiment is a magnetic antenna framework of which an electric field is coupled in the first slot S1 (i.e., a slot antenna), so its resonant mode is less likely to be affected by the human body and the antenna efficiency is enhanced. Also, since the antenna structure 100 in the embodiment is a magnetic antenna framework, in the earphone module 20 of the embodiment, an antenna clearance area is not required to be provided on a circuit board (e.g., a first circuit board 50 in FIG. 2) or a mainboard, and the space on the circuit board or the mainboard can be fully used.

In addition, as shown in FIG. 1, in the embodiment, the earphone module 20 is a touch earphone module and further includes a touch panel 40 and a second insulating member 45. The touch panel 40 is disposed beside the first radiator 110 (e.g., the upper side in FIG. 1), and a second slot S2 is formed therebetween to separate the touch panel 40 and the first radiator 110. The first radiator 110 is located between the touch panel 40 and the second radiator 120.

The second insulating member 45 is disposed in the second slot S2 to keep the appearance complete. The width of the second slot S2 is approximately between 1 mm and 2 mm, but is not limited thereto. In this embodiment, the width of the first slot S1 is equal to the width of the second slot S2, but in other embodiments, the width of the first slot S1 may be not equal to the width of the second slot S2. For example, the width of the first slot S1 may be larger or smaller than the width of the second slot S2.

In the conventional electric antenna, a larger distance is required between the antenna and a touch panel to reduce electric coupling between the antenna and the touch panel. Also, the area of the touch panel is reduced to prevent the touch panel (for example, at the edge part) from being too close to the antenna. Since the earphone module 20 in the embodiment adopts a magnetic antenna framework, the touch panel 40 of the earphone module 20 is not required to be far from the upper edge of the first radiator 110, and the earphone module 20 can adopt a large-area touch panel 40.

In addition, in the earphone module 20 of this embodiment, the touch panel 40 and the first radiator 110 may be selectively located at different planes. More specifically, in FIG. 1, the touch panel 40 is horizontal, and the first radiator 110 extends in upward-downward directions. As a result, the touch panel 40 and the first radiator 110 are designed to be located at the different planes to avoid being affected by each other and further avoid the mutual interference between the touch signal and the antenna signal.

As shown in FIG. 1, in the embodiment, the first radiator 110, the second radiator 120, the conductive member 130, the first insulating member 140, the touch panel 40, and the second insulating member 45 collectively serve as the shell 30 of the earphone module 20. In other embodiments, the earphone module may not include the touch panel 40 and the second insulating member 45. In such an earphone module, the region where the touch panel 40 and the second insulating member 45 are located in FIG. 1 may be replaced by the first radiator 110 or other insulating members. The form of the earphone module is not limited to FIG. 1.

Figure 2:
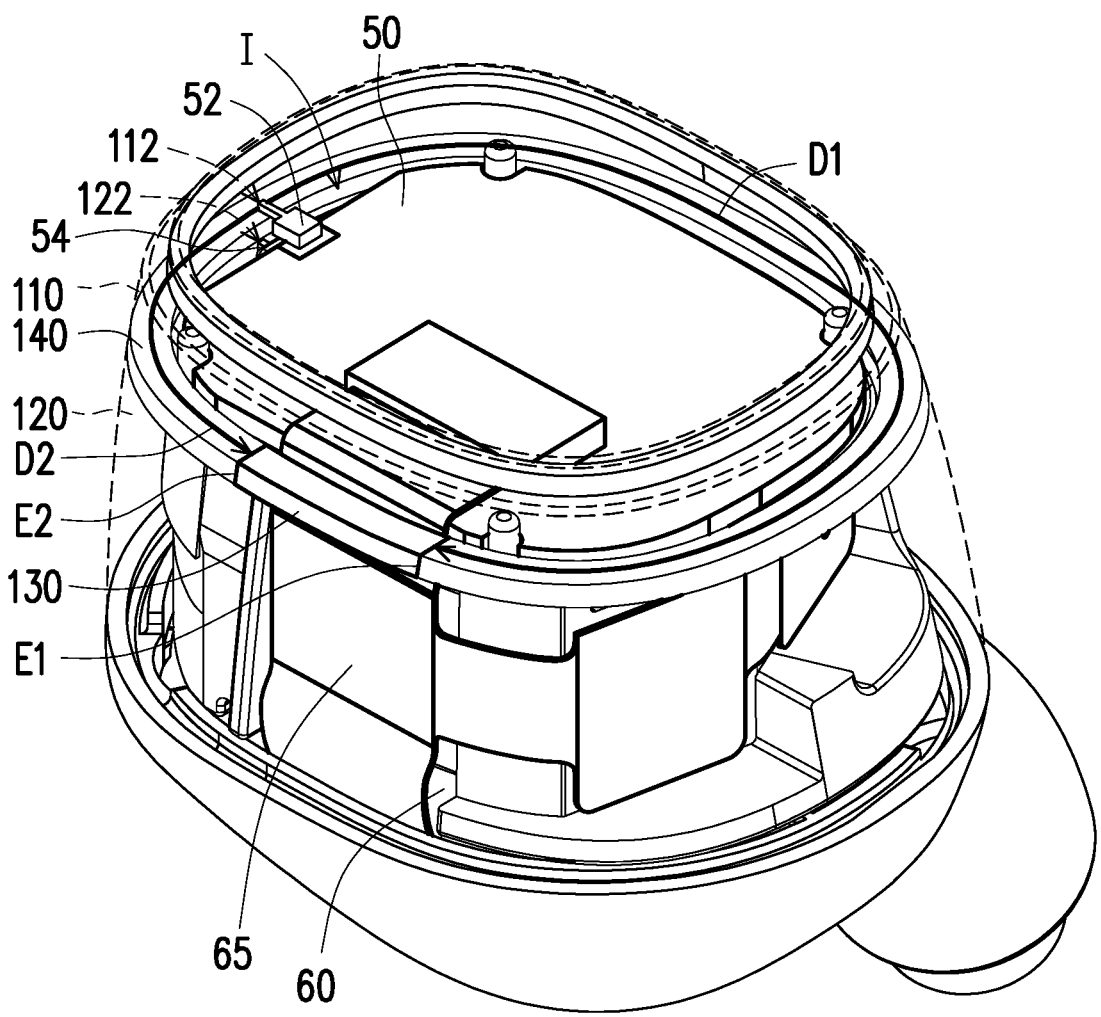
FIG. 2 is a schematic perspective view of the earphone module in FIG. 1.
Figure 3:
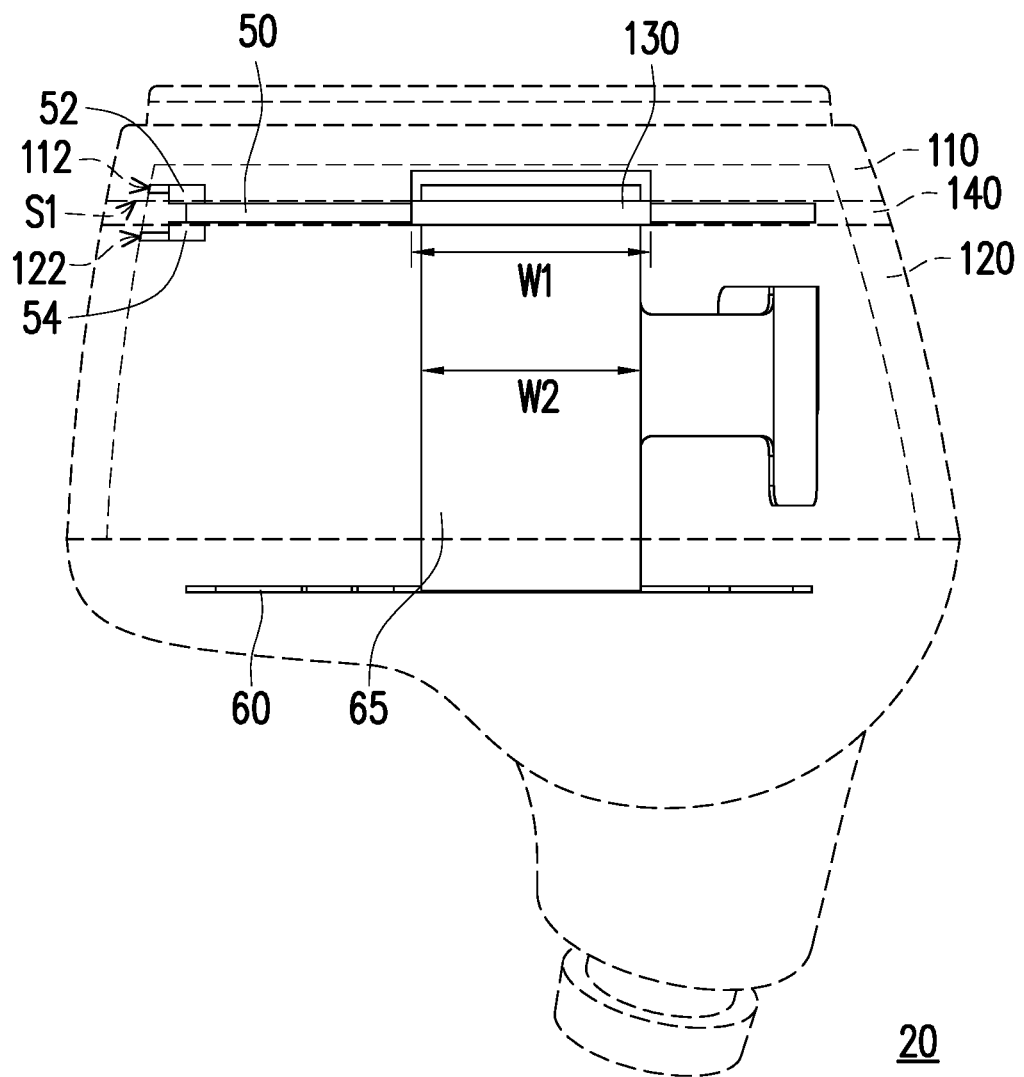
FIG. 3 is a schematic perspective view showing a first circuit board, a second circuit board, and a flexible circuit board of the earphone module in FIG. 1.

FIG. 2 is a schematic perspective view of the earphone module in FIG. 1. FIG. 3 is a schematic perspective view showing a first circuit board, a second circuit board, and a flexible circuit board of the earphone module in FIG. 1. Referring to FIG. 2 and FIG. 3, the earphone module 20 further includes a first circuit board 50 disposed in the shell 30. The first circuit board 50 includes a first antenna spring 52 and a second antenna spring 54 located at two opposite surfaces, i.e., the upper and lower surfaces. The first radiator 110 includes a feeding end 112, and the second radiator 120 includes a ground end 122. As shown in FIG. 3, the first antenna spring 52 abuts against the feeding end 112 of the first radiator 110, and the second antenna spring 54 abuts against the ground end 122 of the second radiator 120.

In addition, the earphone module 20 further includes a second circuit board 60 and a flexible circuit board 65. The second circuit board 60 is disposed in the shell 30 and is disposed at one side of the first circuit board 50 (for example, at the lower side in FIG. 3). The flexible circuit board 65 is connected to the first circuit board 50 and the second circuit board 60 to electrically connect the first circuit board 50 to the second circuit board 60.

As shown in FIG. 3, in the embodiment, the first circuit board 50 is aligned with the first slot S1, which makes the overall response of the antenna signal better. In addition, since the first circuit board 50 is aligned with the first slot S1, a distance between the upper surface of the first circuit board 50 and the first radiator 110 is close to a distance between the lower surface of the first circuit board 50 and the second radiator 120. Therefore, the first antenna spring 52 and the second antenna spring 54 may choose a compatible element to abut against the first radiator 110 and the second radiator 120 so as to increase the convenience of manufacturing.

In other embodiments, if the first circuit board 50 is not aligned with the first slot S1, (for example, the first circuit board 50 is lower than the first slot S1), the first antenna spring 52 located at the upper surface is required to choose an element with a larger height so as to ensure that the first antenna spring 52 can abut against the first radiator 110. That is, in this case, the first antenna spring 52 and the second antenna spring 54 may be required to choose different components.

On the other hand, as shown in FIG. 2 and FIG. 3, in the embodiment, the conductive member 130 is disposed to correspond to the flexible circuit board 65. That is, the conductive member 130 is disposed at a position close to the flexible circuit board 65. Since the flexible circuit board 65 may affect the electric field at the first slot S1, disposing the conductive member 130 at a position close to the flexible circuit board 65 can reduce the chance of the flexible circuit board 65 affecting the electric field at the first slot S1 and avoid affecting the antenna signal.

In addition, in the embodiment, a width W1 of the conductive member 130 is larger than or equal to a width W2 of the flexible circuit board 65. The conductive member 130 is used for electrical isolation to reduce the chance of the flexible circuit board 65 affecting the electric field at the first slot S1, and in practice, this design can effectively extend the impedance bandwidth and enhance the antenna efficiency of a Bluetooth operating frequency band.

Furthermore, as shown in FIG. 2, in the embodiment, the first circuit board 50 includes an edge close to the first antenna spring 52 and the second antenna spring 54 (the edge located at the top left side of the first circuit board 50 in FIG. 2). There is a gap I between the edge and the shell 30 so that a distance between the first circuit board 50 and the first radiator 110 and a distance between the first circuit board 50 and the second radiator 120 are not so small as to affect the transmission of the antenna signal. The width of the gap I is approximately between 0.3 mm and 1 mm, but is not limited thereto.

On the other hand, in the embodiment, a first distance D1 from the position where the first slot S1 is close to the feeding end 112 to the first end E1 is larger than a second distance D2 from the position where the first slot S1 is close to the feeding end 112 to the second end E2.

More specifically, the first slot S1 is divided into two parts. One part starts from the feeding end 112, extends clockwise (toward the right side in FIG. 2) around approximately three-fourths of the first slot S1, and ends at the first end E1. The other part starts from the feeding end 112, extends counterclockwise (toward the left side in FIG. 2) around approximately one-fourth of the first slot S1, and ends at the second end E2. The first distance D1 is larger than or equal to approximately three times the second distance D2. In the embodiment, the length of the first distance D1 is between 38 mm and 42 mm. For example, the first distance D1 is 40 mm and is suitable for coupling out an operating frequency band of 2.25 GHz to 2.6 GHz, which exhibits good radiation efficiency, meets the requirement for a resonant path in a magnetic antenna framework, and fully covers the Bluetooth operating frequency band (2.4 GHz to 2.484 GHz). The second distance is used to adjust impedance matching of the frequency band.

Generally, in the embodiment, the antenna structure 100 of the earphone module 20 may couple out a signal of 2.4 GHz by the following method. First, the length of the first slot S1 is controlled at two-thirds of a wavelength of the frequency of 2.4 GHz. Second, the position of the feeding end 112 is selected so that the first distance and the second distance have appropriate lengths so as to couple out a signal at 2.4 GHz while exhibiting good impedance matching. Third, the first insulating member 140 with a relative dielectric constant between 2.7 and 3.0 is selected.

When the relative dielectric constant of the first insulating member 140 is higher, the frequency band of the antenna signal moves toward the lower frequency. When the relative dielectric constant of the first insulating member 140 is lower, the frequency band of the antenna signal moves toward the higher frequency. When the relative dielectric constant of the first insulating member 140 is between 2.7 and 3.0, the frequency band of the antenna signal more closely matches the frequency band of 2.4 GHz. Through the design above, the antenna structure 100 of the earphone module 20 can have an enhanced radiation performance.

Figure 4:
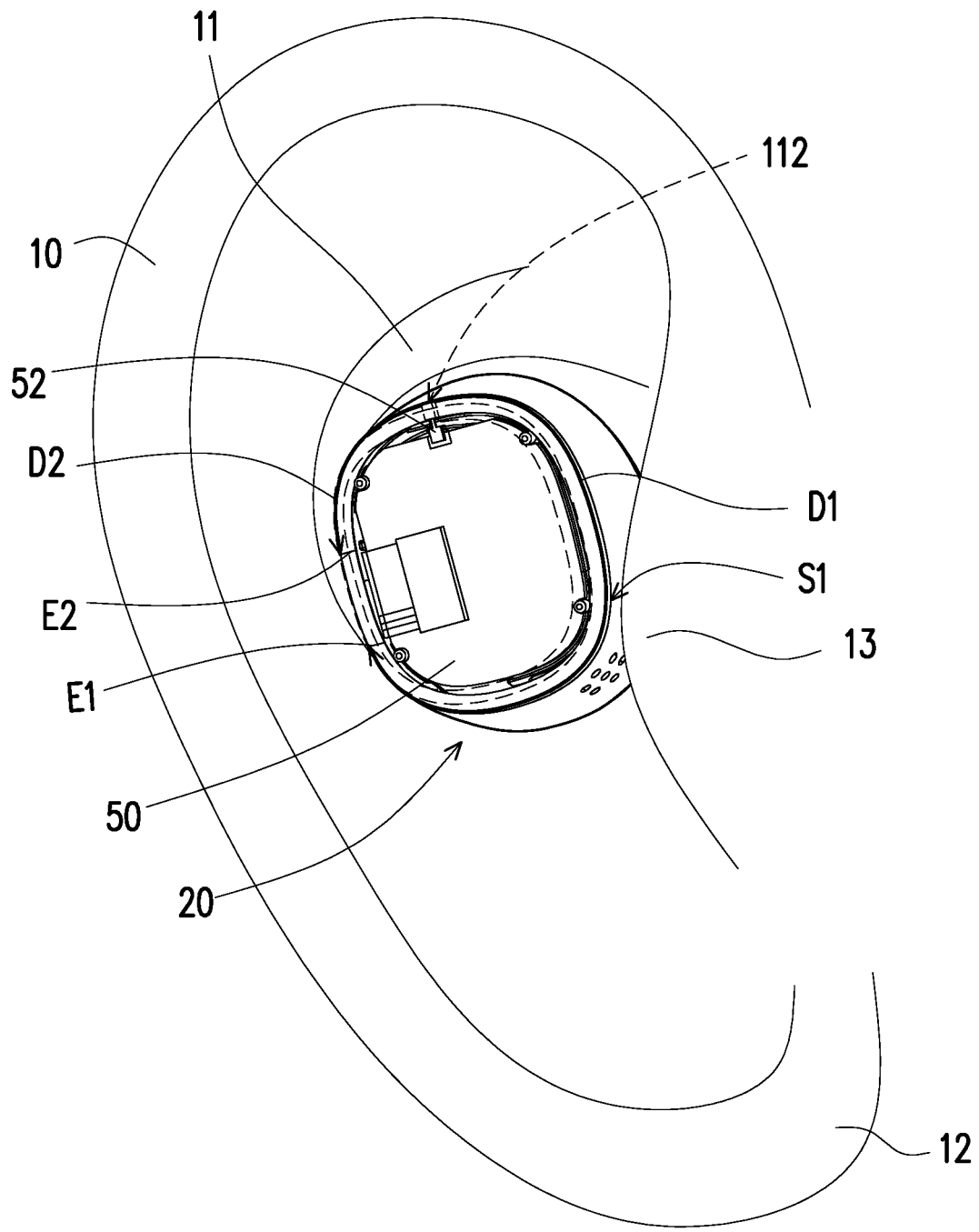
FIG. 4 is a schematic view illustrating the earphone module in FIG. 1 put in a human ear.

FIG. 4 is a schematic view illustrating the earphone module in FIG. 1 put in a human ear. In FIG. 4, the earphone module 20 is presented in a perspective view to clearly show the relative locations of the feeding end 112 and the first end E1 and the second end E2 of the first slot S1. Referring to FIG. 4, a human ear 10 includes an antihelix 11 located above the hole (where the earphone module 20 is inserted) of an ear canal, an earlobe 12 located below the hole of the ear canal, and a tragus 13 located between the hole of the ear canal and the face.

There may be a Bluetooth connection between the earphone module 20 and an electronic device (not shown; for example, a cellphone or a tablet computer). For example, a cellphone may be held in a user's hand or be put in a pocket. The Bluetooth connection between the earphone module 20 and the electronic device may be blocked by the human body. In the embodiment, when the earphone module 20 is put in the human ear 10, the feeding end 112 is close to the antihelix 11 of the human ear 10 and away from the earlobe 12. This design enables the Bluetooth connection between the earphone module 20 and the electronic device to have good cross-body (cross-human body) performance.

More specifically, the antenna resonant path starts from the feeding end 112 which is close to the antihelix 11, extends along the path circled by the first distance D1 and passes by a part of the human ear 10 which is close to the tragus 13 and the earlobe 12, and finally ends at the first end E1 of the first slot S1. A relative distance between the antenna resonant path and an ear bone is farther, which can reduce the chance of the ear bone absorbing the antenna signal when wearing the earphone, thereby reducing the effect of the human ear on the antenna signal. Furthermore, since the current distribution of the magnetic antenna framework is limited by boundary conditions of materials, in practice, the frequency deviation due to wearing conditions of different people is reduced, so the radiation performance can be optimized. In addition, with the feeding end 112 being close to the antihelix 11 of the human ear 10, the antenna can radiate in the direction toward the bottom right in FIG. 4 (i.e., toward where the cellphone is located) to enhance the cross-body performance.

Figure 5:
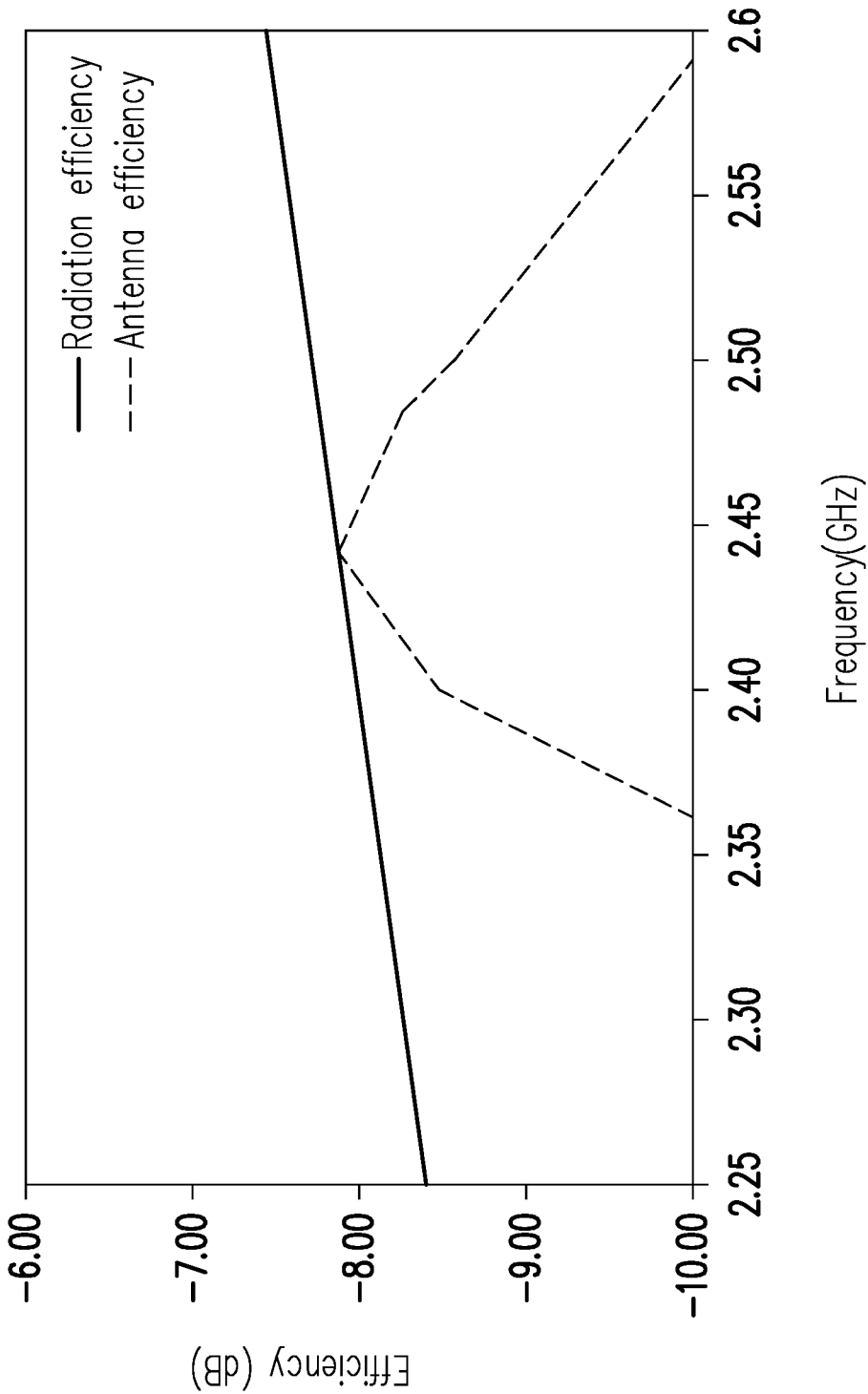
FIG. 5 is a diagram illustrating the relation between the efficiency and the frequency of the earphone module in FIG. 1.

FIG. 5 is a diagram illustrating the relation between the efficiency and the frequency of the earphone module in FIG. 1. Referring to FIG. 5, in the embodiment, when the antenna structure 100 of the earphone module 20 is worn into a human ear, the radiation efficiency at the frequency band of 2.4 GHz to 2.484 GHz is greater than −8.0 dB, and the antenna efficiency optimized by the matching circuit is greater than −8.5 dB, so the performance is favorable for wearing.

In summary of the above, in the disclosure, the first radiator, the second radiator, the conductive member, and the first insulating member of the earphone module collectively serve as at least a part of the shell of the earphone module. The first radiator includes a feeding end, and the second radiator includes a ground end. The conductive member is connected to the first radiator and the second radiator. A first slot is formed between the first radiator and the second radiator to separate the first radiator and the second radiator from each other. The first insulating member is disposed in the first slot to keep the appearance complete. Through the design above, the earphone module of the disclosure has a structure in the form of a magnetic antenna. Since its resonant mode is less likely to be affected by a human body, the antenna efficiency is enhanced. Also, an antenna clearance area is not required to be provided on the circuit board or the mainboard to enhance the performance of the antenna, so the space on the circuit board or the mainboard can be fully used.

What is claimed is:

1. An earphone module, comprising:
    an antenna structure, comprising:
        a first radiator comprising a feeding end;
        a second radiator comprising a ground end, wherein a first slot is formed between the first radiator and the second radiator;
        a conductive member connected to the first radiator and the second radiator; and
        a first insulating member disposed in the first slot, wherein
        the first radiator, the second radiator, the conductive member, and the first insulating member collectively serve as at least a part of a shell of the earphone module.

2. The earphone module according to claim 1, further comprising:
    a touch panel disposed beside the first radiator, wherein a second slot is formed between the touch panel and the first radiator; and
    a second insulating member disposed in the second slot, wherein the first radiator, the second radiator, the conductive member, the first insulating member, the touch panel, and the second insulating member collectively serve as the shell of the earphone module.

3. The earphone module according to claim 2, wherein the touch panel and the first radiator are located at different planes.

4. The earphone module according to claim 1, further comprising:
    a first circuit board disposed in the shell and comprising a first antenna spring and a second antenna spring located at two opposite surfaces, wherein the first antenna spring abuts against the feeding end of the first radiator, and the second antenna spring abuts against the ground end of the second radiator.

5. The earphone module according to claim 4, wherein the first circuit board comprises an edge close to the first antenna spring and the second antenna spring, and a gap is present between the edge and the shell.

6. The earphone module according to claim 4, wherein the first circuit board is aligned with the first slot.

7. The earphone module according to claim 4, further comprising:
    a second circuit board disposed in the shell and disposed at one side of the first circuit board; and
    a flexible circuit board connected to the first circuit board and the second circuit board to electrically connect the first circuit board to the second circuit board, wherein the conductive member is disposed to correspond to the flexible circuit board.

8. The earphone module according to claim 7, wherein a width of the conductive member is larger than or equal to a width of the flexible circuit board.

9. The earphone module according to claim 1, wherein the antenna structure couples out a frequency band, and a length of the first slot is two-thirds of a wavelength of the frequency band.

10. The earphone module according to claim 1, wherein the first slot comprises a first end and a second end, and the conductive member is located between the first end and the second end, wherein a first distance from a position where the first slot is close to the feeding end to the first end is larger than a second distance from the position where the first slot is close to the feeding end to the second end.

11. The earphone module according to claim 10, wherein the first distance is used to couple out a frequency band, and the second distance is used to adjust impedance matching of the frequency band.

12. The earphone module according to claim 10, wherein the first distance is larger than or equal to three times the second distance.

13. The earphone module according to claim 1, wherein the feeding end is close to an antihelix of a human ear and away from an earlobe when the earphone module is put in the human ear.

\* \* \* \* \*